(No Model.) 4 Sheets—Sheet 1.
G. H. WATSON.
FEED WATER HEATER, PURIFIER AND CIRCULATOR.
No. 364,454. Patented June 7, 1887.
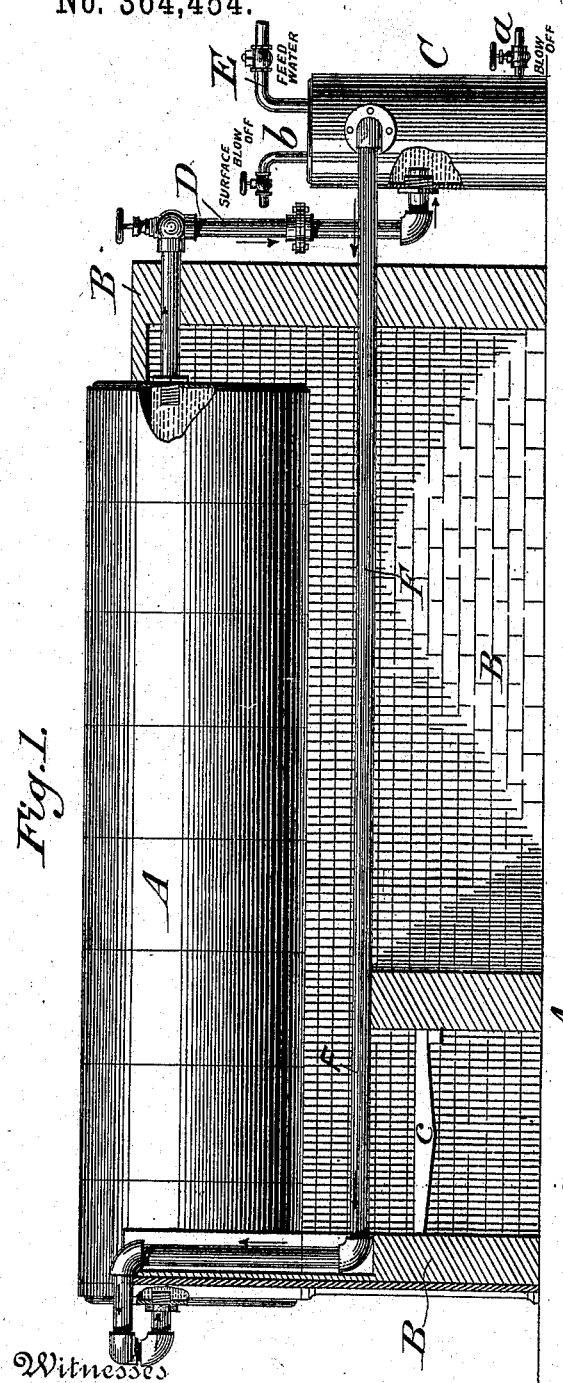
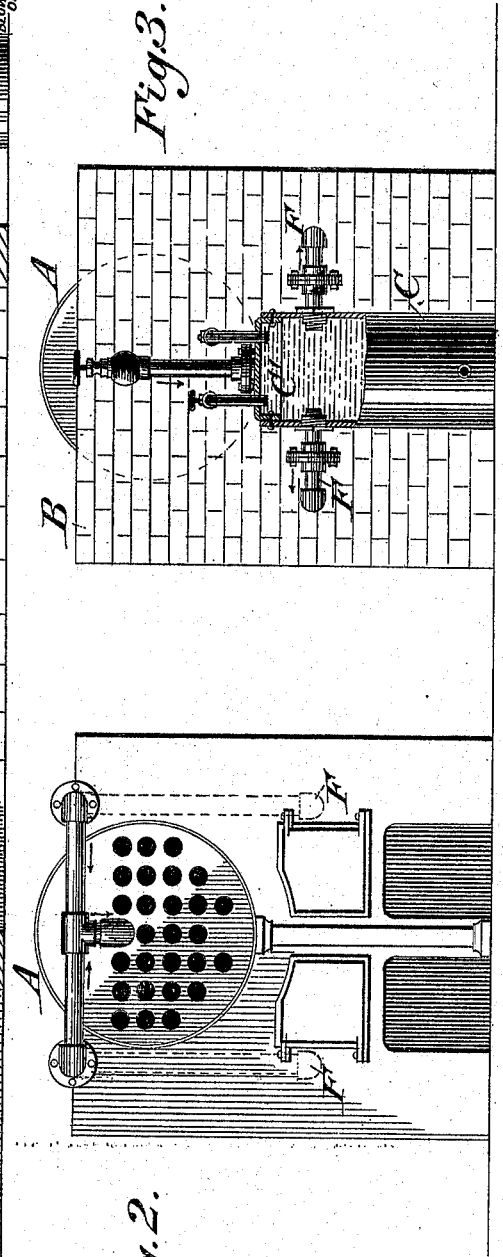
Witnesses
F. H. Schott
Fred E. Tasker
Inventor
George H. Watson
By his Attorney John C. Tasker

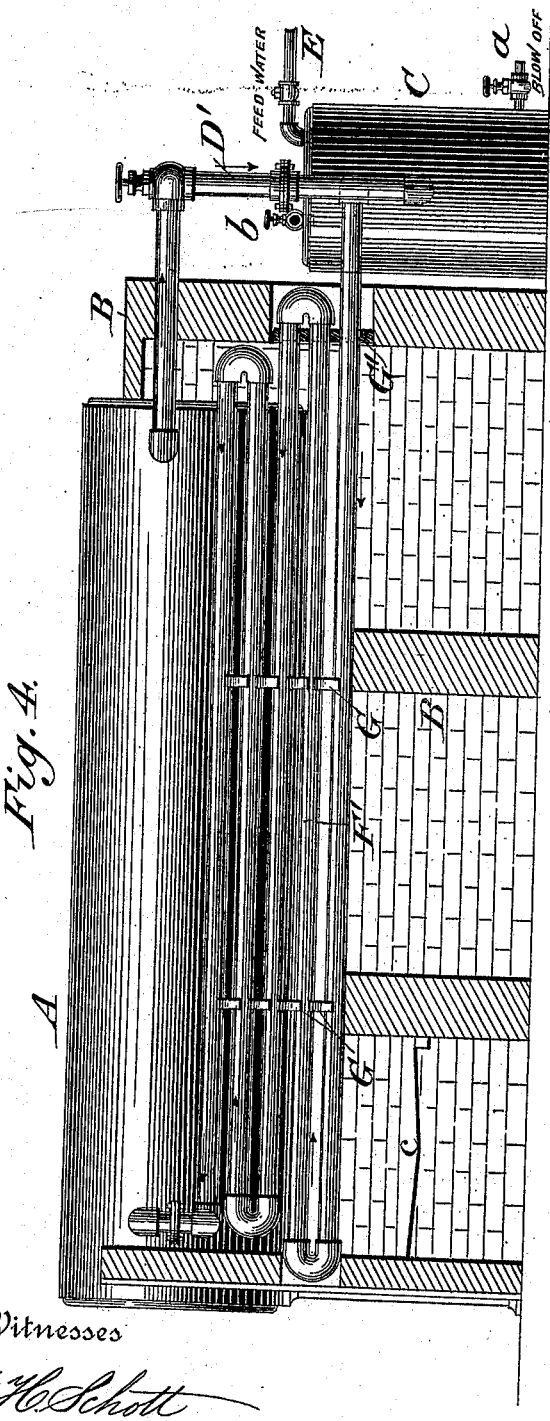

(No Model.) 4 Sheets—Sheet 3.
G. H. WATSON.
FEED WATER HEATER, PURIFIER AND CIRCULATOR.
No. 364,454. Patented June 7, 1887.
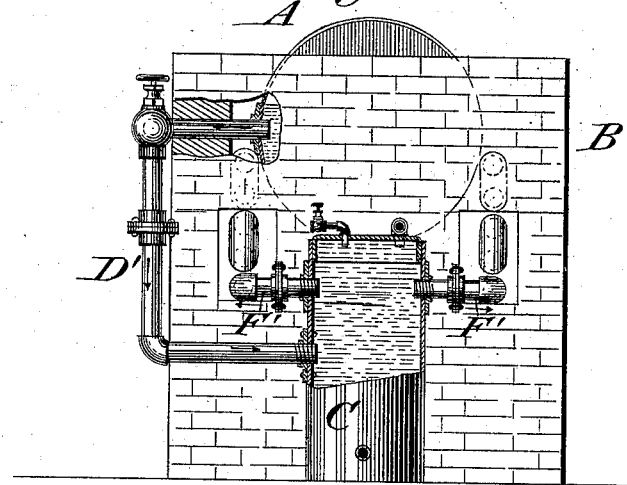
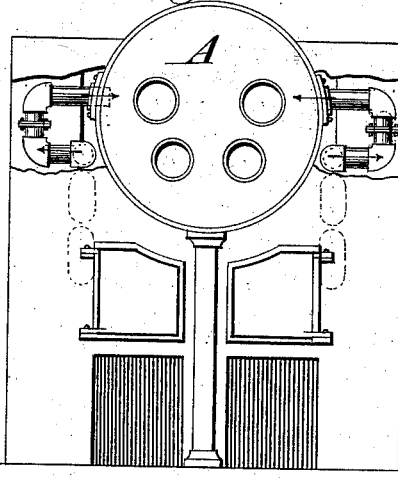
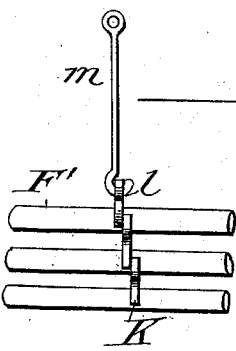
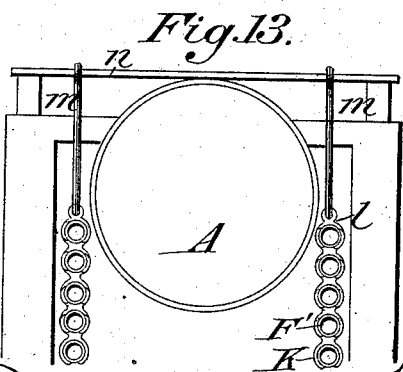
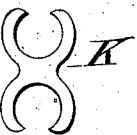
Witnesses
F. H. Schott
Fred E. Tasker
Inventor
George H. Watson.
By his Attorney John C. Tasker (No Model.)
4 Sheets—Sheet 4.
G. H. WATSON.
FEED WATER HEATER, PURIFIER AND CIRCULATOR.
No. 364,454. Patented June 7, 1887.
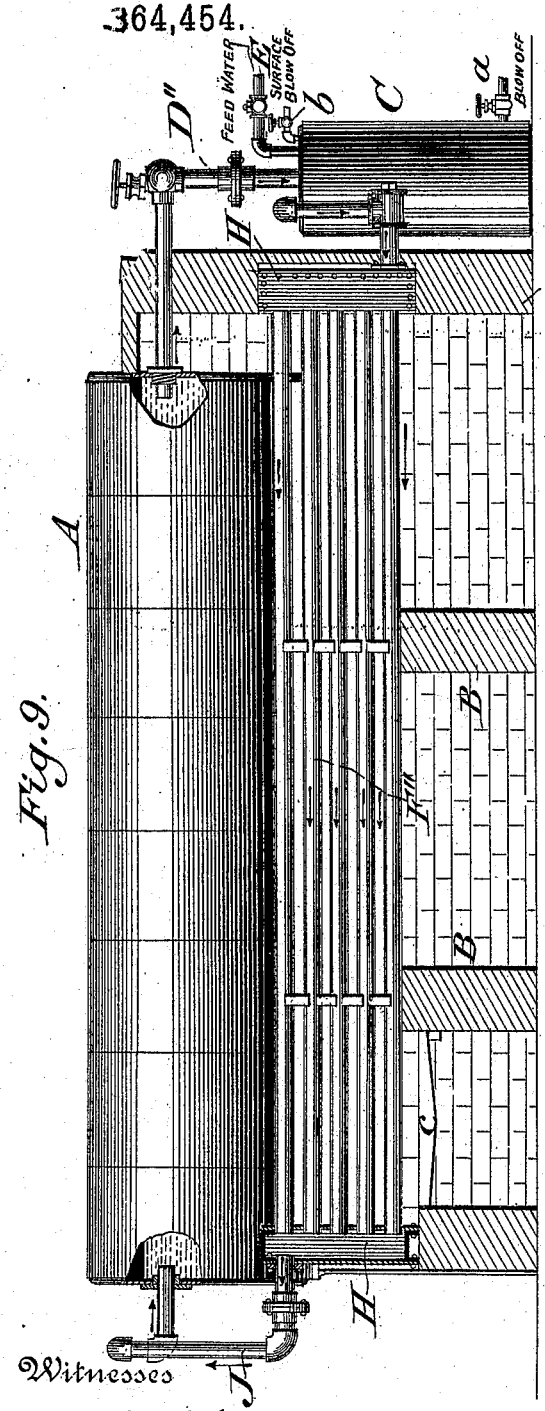
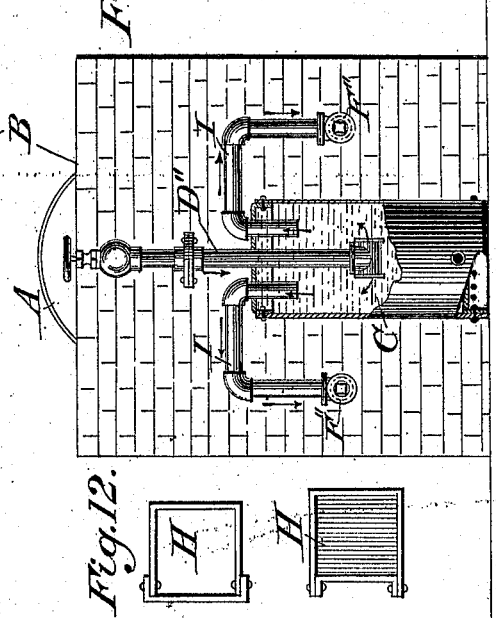
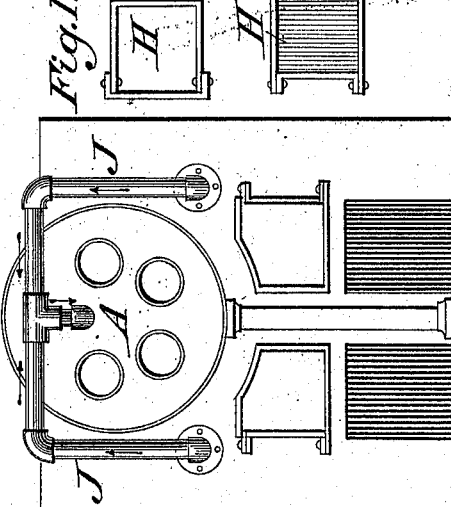
Witnesses
F. H. Schott
Fred E. Tasker
Inventor
George H. Watson
By his Attorney John C. Tasker

UNITED STATES PATENT OFFICE.

GEORGE H. WATSON, OF ST. LOUIS, MISSOURI.

FEED-WATER HEATER, PURIFIER, AND CIRCULATOR.

SPECIFICATION forming part of Letters Patent No. 364,454, dated June 7, 1887.

Application filed January 17, 1887. Serial No. 224,589. (No model.)

*To all whom it may concern:*

Be it known that I, GEORGE H. WATSON, a citizen of the United States, residing at St. Louis, in the county of St. Louis and State of Missouri, have invented certain new and useful Improvements in Feed-Water Heaters, Purifiers, and Circulators; and I do hereby declare the following to be a full, clear, and exact description of the invention, such as will enable others skilled in the art to which it appertains to make and use the same.

This invention relates to improvements in steam-boiler attachments and connections, as hereinafter described, whereby hot water from the boiler is conveyed to a sediment-receptacle exterior to the boiler-walls, and there caused to meet and mingle with the feed-water, which may or may not have been previously heated, the object being to effect a precipitation within the sediment-receptacle of the impurities contained in the feed-water, and so purify the same before it is delivered to the boiler and its steam-generating connections.

The invention further consists in the peculiar construction of the sediment or water-purifying receptacle, which is located, irrespective of any feed-water supply, in connection with pipes or tubes that carry the water from the boiler to the receptacle and return it thence over the fire to the boiler after having been freed of its impurities within the receptacle, which is so formed in its upper portion and has the ingress and exit pipes so arranged that the lighter impurities will collect in the said upper part and be prevented from entering the boiler, while the heavier impurities will gravitate to the bottom.

The invention also comprises the arrangement, with the receptacle and the boiler, of a system of circulating feed-water heating and steam-generating pipes, tubes, or conduits, that are exposed to the fire and communicate with the interior of the boiler, and it also includes certain peculiarities in the construction, arrangement, and combination of the various parts, substantially as will be herein set forth and claimed.

In the annexed drawings, illustrating my invention, Figure 1 is a longitudinal side elevation of a steam-boiler provided with my improved water-purifying, feed-water heating, circulating, and steam-generating attachments, the furnace-walls being shown in section. Fig. 2 is a front end view of the same. Fig. 3 is a rear end view showing the sediment-receptacle in partial section. Fig. 4 is a side view of a boiler and connections, with the walls in section, showing a modification in the arrangement of the feed-water heating, circulating, and steam-generating pipes. Fig. 5 is an enlarged detail view of a part of the steam-generating pipes shown in Fig. 4. Fig. 6 is a perspective of one of the spreaders that are employed to separate these pipes. Fig. 7 is a rear view of the boiler, boiler-walls, and sediment-receptacle, as shown in Fig. 4, indicating the latter in section. Fig. 8 is a front view of the parts shown in Fig. 4, the front wall being broken away to expose the pipes. Fig. 9 is a side view of a boiler and connections, showing another modification in the arrangement of the feed-water heating and steam-generating pipes. Fig. 10 is a front end view of the same. Fig. 11 is a rear end view showing the sediment-receptacle in partial section and a modified arrangement therewith of the pipes that connect with the steam-generating pipes and the pipes that enter the receptacle from the boiler. Fig. 12 is a plan view of one of the vertical chambers into which the extremities of the steam-generating tubes are expanded. Fig. 13 is an outline end representation of a boiler and the steam-generating pipes, and shows a modified mode of suspending these pipes alongside of the boiler. Fig. 14 is a side view of a portion of a few parallel steam-generating pipes connected and suspended in this improved manner. Fig. 15 shows details of the suspension devices.

Similar letters of reference designate corresponding parts throughout all the figures.

The boiler A is supported in the furnace-walls B in any suitable manner. Exterior to the furnace-walls, preferably at one end of the boiler, as shown in the drawings, is a sediment-receptacle, C, which may be of any suitable form, the upright cylindrical drum being represented as an example of one convenient form.

In the broad contemplation of my invention the sediment-receptacle is employed to purify the water previous to its transformation into steam, and it therefore connects with the boiler through two passages, one of which conducts water from the boiler to the receptacle while the other conveys the purified water from the receptacle to the boiler, passing it over the fire in its transit, and thus causing steam to be generated. These passages consist of tubes, pipes, or other conduits. They enter the boiler at any convenient and desirable points, and they are introduced into the sediment-receptacle in such a manner that the upper interior portion of said receptacle may serve as a chamber to receive the lighter impurities, thus enabling them to be removed thence by a surface "blow-off" or other device and prevented from entering the boiler, as they might if the communicating-pipes were not so arranged as to permit of this chamber. The heavier impurities fall to the bottom of this receptacle. It will be noted that my improved sediment-receptacle and connections will be equally serviceable in cases where the feed-water is conveyed into the receptacle and there caused to meet and mingle with hot water from the boiler, thus first purifying the feed-water before it enters the boiler, or, in cases where the feed-water is first delivered to the boiler and subsequently carried out into the sediment-receptacle, purified and circulated back over the fire into the boiler again.

One example of mechanism for carrying out my invention is shown in Fig. 1. D represents a pipe extending from the boiler A to the sediment-receptacle C. It is attached to the rear end of the boiler and to the sediment-receptacle at a convenient distance below its top. A feed-water pipe, E, enters the upper end of the receptacle. Hot water, therefore, as it is conveyed to the receptacle C through pipe D, is caused to meet and mingle in the receptacle with the feed-water coming through pipe E. The impurities are thus precipitated from the feed-water, those that are heavier falling to the bottom of the receptacle, where they can be removed by a blow-off, a, and those that are lighter—such as grease, oil, &c.—remaining at the top in the chamber C', where they can be discharged by the blow-off b without liability of getting into the boiler. The purified water passes out of the receptacle through horizontal pipes F F, that are laid beneath the boiler and above the fire on the grate c, and which communicate with the boiler by a pipe entering the front end of the same. Within these pipes steam is generated and carried to the boiler.

It is evident that if the feed-water pipe E should be dispensed with, or not used, and the water pumped directly into the boiler, instead of into the sediment-receptacle, yet the operation of my improved arrangement will be essentially the same, for although the feed-water will not be purified before it first enters the boiler, still it will pass from the boiler into the receptacle, and there be freed of its impurities, and then returned through the steam-generating pipes to the boiler in its purified condition.

The remaining figures of the drawings after Figs. 1, 2, and 3 serve to illustrate various modifications in the arrangement of the feed-water heating and steam-generating pipes relatively to each other, to the boiler, and to the sediment-receptacle. They are all, however, merely examples indicating substantially equivalent structures and exhibiting equivalent modes of carrying out the same leading features of my invention.

In Figs. 4 and 7 the pipe D' takes the place of pipe D in Fig. 1, the only difference between them being that the pipe D' enters the side of the boiler near the end, instead of entering the end, as does pipe D, and pipe D' also enters the sediment-receptacle at a different point from that of the entrance of pipe D. Further, in Figs. 4 and 5 a series of parallel pipes, F', takes the place of the pipe F of Fig. 1, said series communicating with the boiler on the side near the front end, instead of entering the front end, as in Fig. 1. The series of pipes increases the water-circulating and steam-generating surface. The pipes are preferably held apart and in proper relative position by means of spreaders G and G'. The spreader G is separately shown in Fig. 6, and the spreader G', as shown in Fig. 5, consists of a perforated plate inserted in the boiler wall and upholding the pipes near their extremities.

In Figs. 9, 10, and 11 another modification in the arrangement of the steam-generating and other pipes is shown. Here the pipe D", which corresponds to the pipe D of Fig. 1, enters the boiler through its rear end and the sediment-receptacle through its top; but it extends downward a certain distance within the receptacle, so that the mouth where the water is discharged is below the chamber which receives the lighter impurities, and consequently is out of the way of such impurities. In this example of my invention I employ a series of steam-generating pipes, F''', in place of the pipes F of Fig. 1. The pipes F''' of each series, there being, as usual, two series, one along each side of the boiler, pass at either end into vertical chambers H. The rearmost of these chambers communicates with the sediment-receptacle by pipes I, which enter the receptacle through the top and pass downward a sufficient distance to open into the receptacle below the part which contains the lighter impurities. The front chambers, H, communicate with the front end of the boiler by means of suitable pipes, as J.

In Figs. 13, 14, and 15 are shown devices for suspending the steam-generating pipes. These devices are of the form shown in Fig. 15. K represents a casting formed as a couple of incomplete rings. L represents one incomplete ring, which is pierced at l, to allow a hook, m, to engage it. The ring L will sustain the one pipe, if only one is used, it being inserted through said ring; but when several are used the ring L is placed overlapping one of the rings of casting K, and a pipe is inserted through the circle thus formed. The castings K overlap each other in a vertical series, and the pipes are thus arranged parallel to each other. The hooks $m$, which are attached to some convenient support, as bar $n$, serve to support the series of pipes that are thus connected together.

Having thus described my invention, what I claim as new, and desire to secure by Letters Patent, is—

1. The combination, with a steam-boiler, of a sediment-receptacle exterior to the boiler-walls, a feed-pipe connected to said receptacle, a pipe or pipes for conveying hot water from the boiler to meet the feed-water in the sediment-receptacle, and a pipe or pipes exposed to the fire for conveying the purified water from said receptacle to the boiler, substantially as described.

2. The combination, with a steam-boiler, a sediment-receptacle so constructed that the lighter impurities of the water will ascend into the upper interior thereof, while the heavier fall to the bottom, and a pipe for conveying feed-water to said receptacle, of a pipe or pipes for carrying hot water from the boiler to the receptacle, and a pipe or pipes for reconveying the purified water from the receptacle to the boiler, said pipes being arranged to so enter the sediment-receptacle that the lighter or heavier impurities will not be disturbed or carried to the boiler thereby, but be left for removal by proper means, substantially as described.

3. The combination of a steam-boiler, a sediment-receptacle located exterior thereto and having its upper interior portion adapted to receive the lighter impurities of the water, where they may be retained until removed by suitable means, while the heavier fall to the bottom, a pipe for carrying water from the boiler to the receptacle, and a pipe for returning the purified water to the boiler, substantially as described.

4. In a steam-generator, the combination of a cylinder, steam-generating pipes beneath it and over the fire, and a receptacle adapted to receive in its upper portion the lighter impurities of the water until removed by suitable means, the receptacle being located exterior to the boiler-walls, and through which the water from the cylinder must pass before it enters the steam-generating pipes to be converted into steam and returned to the cylinder, substantially as described.

In testimony whereof I affix my signature in presence of two witnesses.

GEORGE H. WATSON.

Witnesses:
PHILIP MAURO,
FRED E. TASKER.